US011722780B2

(12) United States Patent
Ved et al.

(10) Patent No.: US 11,722,780 B2
(45) Date of Patent: Aug. 8, 2023

(54) INTELLIGENT CLOUD-ASSISTED VIDEO LIGHTING ADJUSTMENTS FOR CLOUD-BASED VIRTUAL MEETINGS

(71) Applicant: Cisco Technology, Inc., San Jose, CA (US)

(72) Inventors: Ritu Kirit Ved, Santa Clara, CA (US); Nikhil Sainath Kale, Santa Clara, CA (US); John Herman Hess, III, Phoenix, AZ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/504,956

(22) Filed: Oct. 19, 2021

(65) Prior Publication Data
US 2023/0120029 A1    Apr. 20, 2023

(51) Int. Cl.
*H04N 7/15* (2006.01)
*H04N 23/74* (2023.01)
*G06F 3/0482* (2013.01)
*G06F 3/0484* (2022.01)
*H04N 23/71* (2023.01)

(52) U.S. Cl.
CPC ........... *H04N 23/74* (2023.01); *G06F 3/0482* (2013.01); *G06F 3/0484* (2013.01); *H04N 7/15* (2013.01); *H04N 23/71* (2023.01)

(58) Field of Classification Search
CPC .......... H04N 5/235; H04N 7/15; H04N 7/147; G06F 3/0484; G06F 3/0482
USPC ........................................... 348/14.01–14.16
See application file for complete search history.

(56) References Cited

U.S. PATENT DOCUMENTS

| 8,086,066 B2 | 12/2011 | Basso et al. |
| 9,494,844 B2 | 11/2016 | Fisher et al. |
| 10,200,423 B2 | 2/2019 | Holst et al. |
| 10,255,885 B2 | 4/2019 | Hansen |
| 10,277,829 B1 | 4/2019 | Garrido et al. |
| 2007/0121343 A1 | 5/2007 | Brown |

(Continued)

OTHER PUBLICATIONS

Sun, et al., "Active lighting for video conferencing," IEEE Transaction on Circuits and Systems for Video Technology (TCSVT), Jan. 2009, 9 pages.

(Continued)

*Primary Examiner* — Melur Ramakrishnaiah
(74) *Attorney, Agent, or Firm* — Edell, Shapiro & Finnan, LLC

(57) ABSTRACT

With the assistance of a cloud server, a user device is operative to adjust and optimize lighting of a video of a participant in a virtual meeting with use of a selected display configuration. The selected display configuration may be a selected from one of a plurality of display configurations (e.g. a user display, a plurality of displays connected at the user device, the user display and an alternate display of a laptop or a tablet, etc.). The user device may receive, from the cloud server, baseline lighting setting parameters associated with the selected display configuration. The user device may apply the baseline lighting setting parameters to one or more displays of the selected display configuration. Using the baseline lighting setting parameters as a baseline, the user device may automatically adjust a brightness and/or color pixels of the one or more displays of the selected display configuration.

20 Claims, 15 Drawing Sheets

(56) References Cited

U.S. PATENT DOCUMENTS

| | | |
|---|---|---|
| 2010/0321467 A1 | 12/2010 | Goodman |
| 2011/0249072 A1 | 10/2011 | Marks |
| 2016/0142451 A1 | 5/2016 | Ouyang et al. |
| 2017/0339376 A1* | 11/2017 | Cao ..................... H04N 7/181 |
| 2019/0124246 A1 | 4/2019 | Mahowald |
| 2019/0356837 A1* | 11/2019 | Bakshi .................. H04N 9/12 |
| 2021/0044734 A1 | 2/2021 | Tangeland et al. |
| 2021/0118404 A1* | 4/2021 | Bartscherer .............. G09G 3/32 |
| 2022/0070409 A1* | 3/2022 | Walsh ................... H04N 7/142 |
| 2022/0262326 A1* | 8/2022 | Sommerlade ........ G06V 10/774 |

OTHER PUBLICATIONS

Kolonia, "How to: Balance Indoorand Outdoor Lighting," https://www.popphoto.com/how-to/2011/06/how-to-balance-indoor-and-outdoor-lighting/, Jun. 2011, 3 pages.

Boyadzhiev, et al., "User-guided White Balance for Mixed Lighting Conditions," www.cs.cornell.edu/projects/white_balance/download/mixed_lighting_white_balance_hires.pdf, Sep. 2012, 10 pages.

Paradiso, "Adaptive Lighting," https://resenv.media.mit.edu/lighting/adaptive_lighting/adaptive_lighting.html, Feb. 2016, 4 pages.

\* cited by examiner

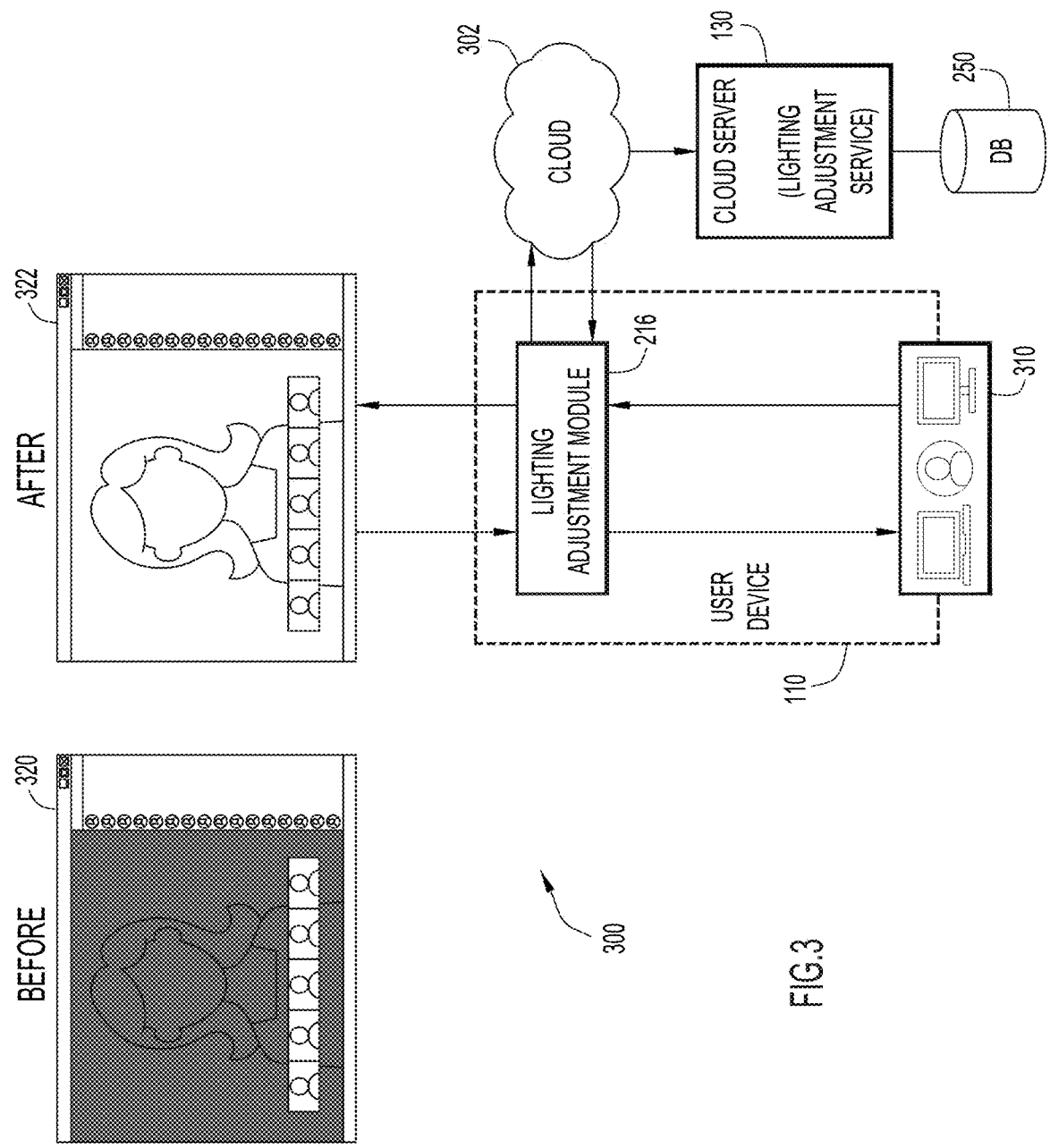

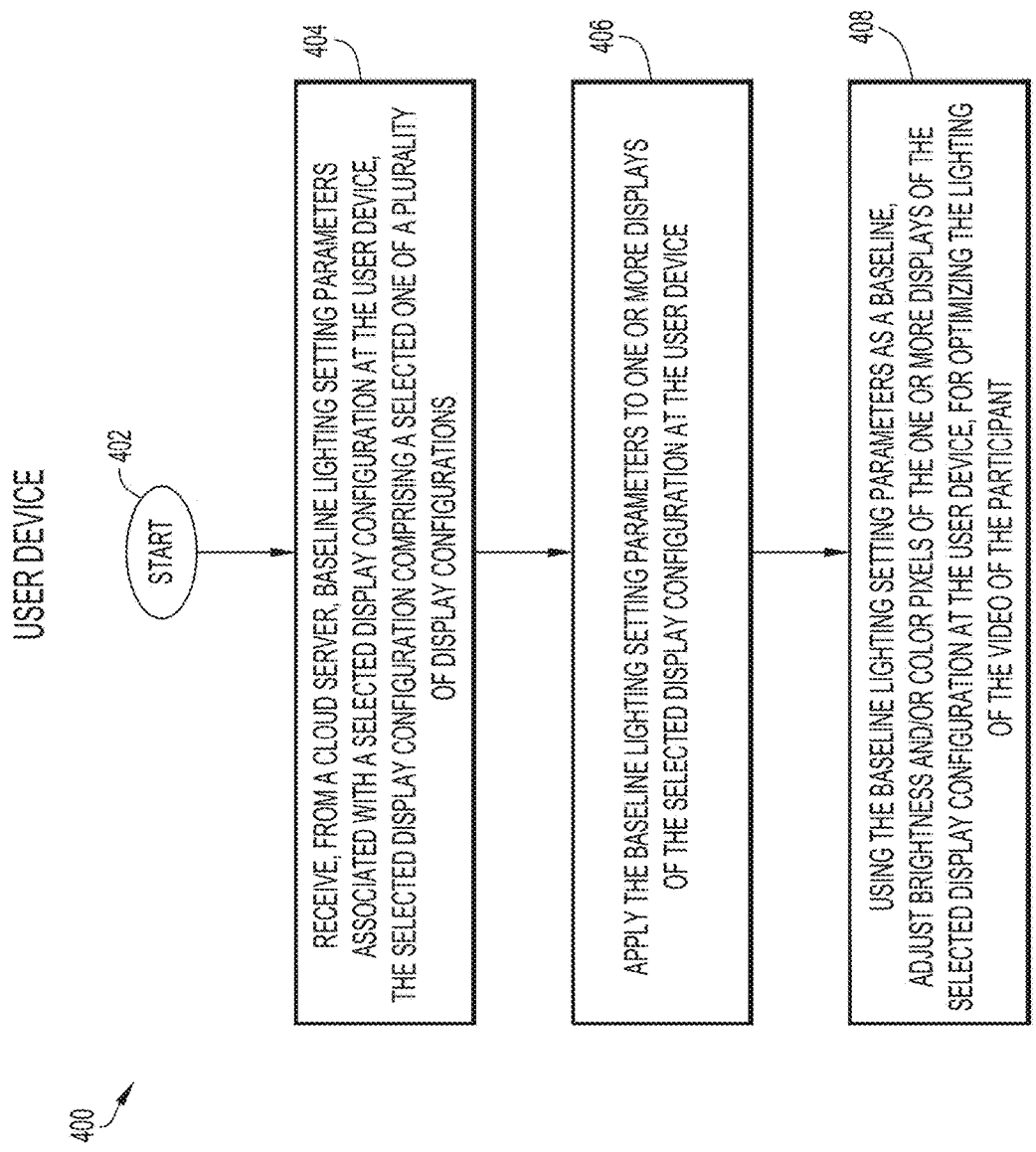

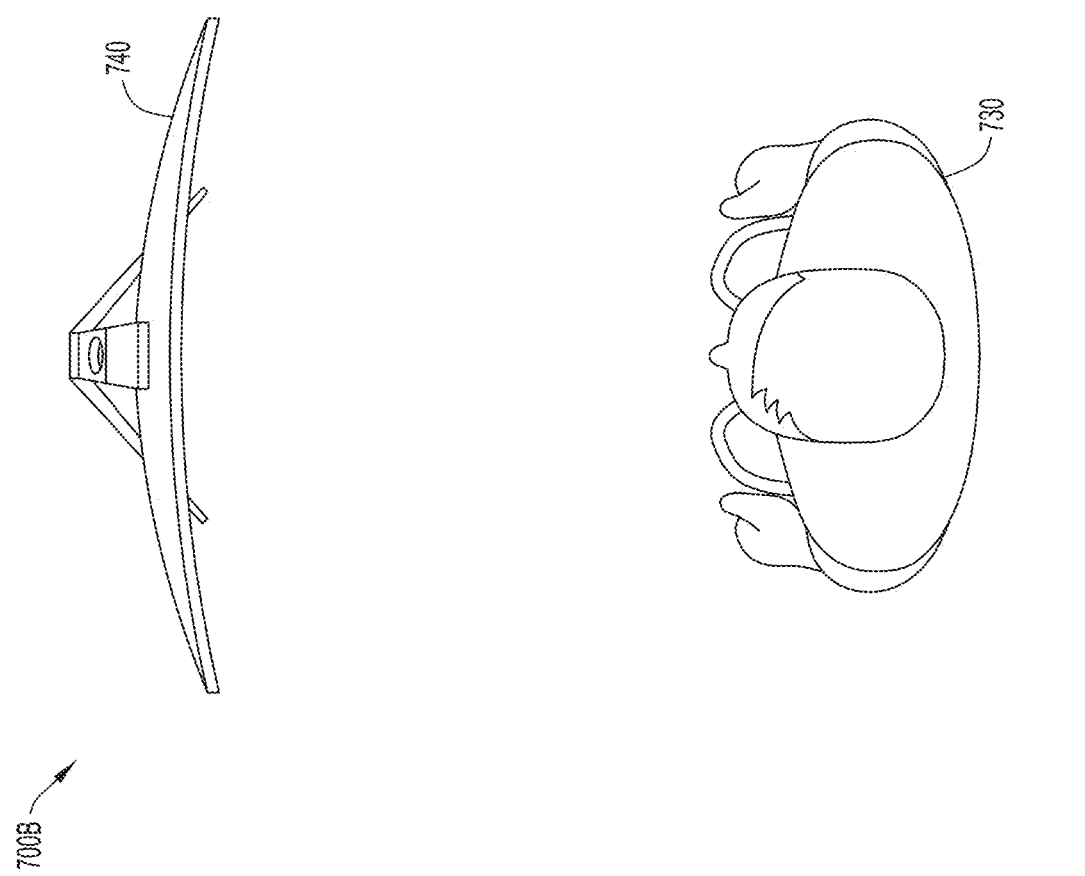

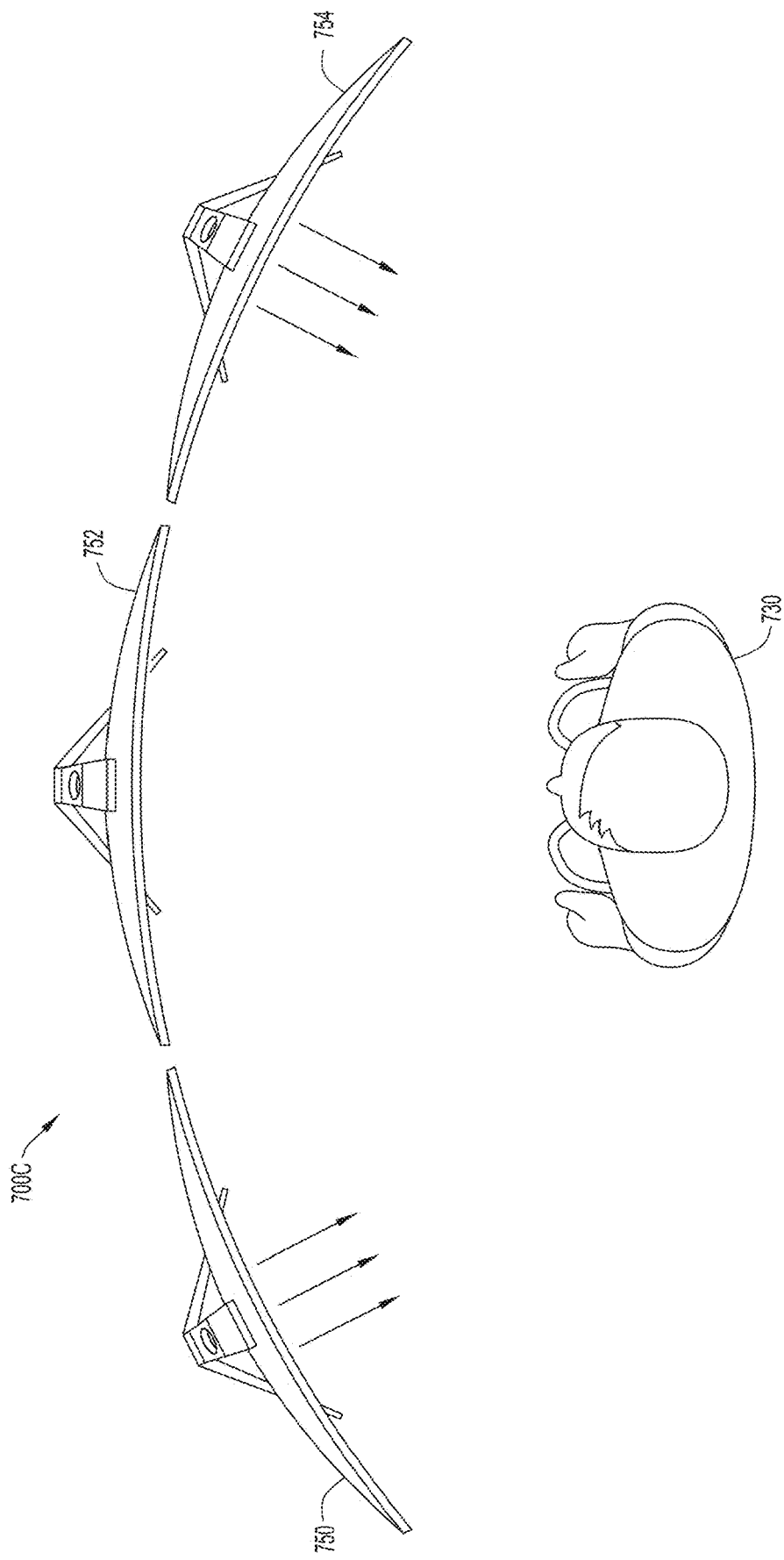

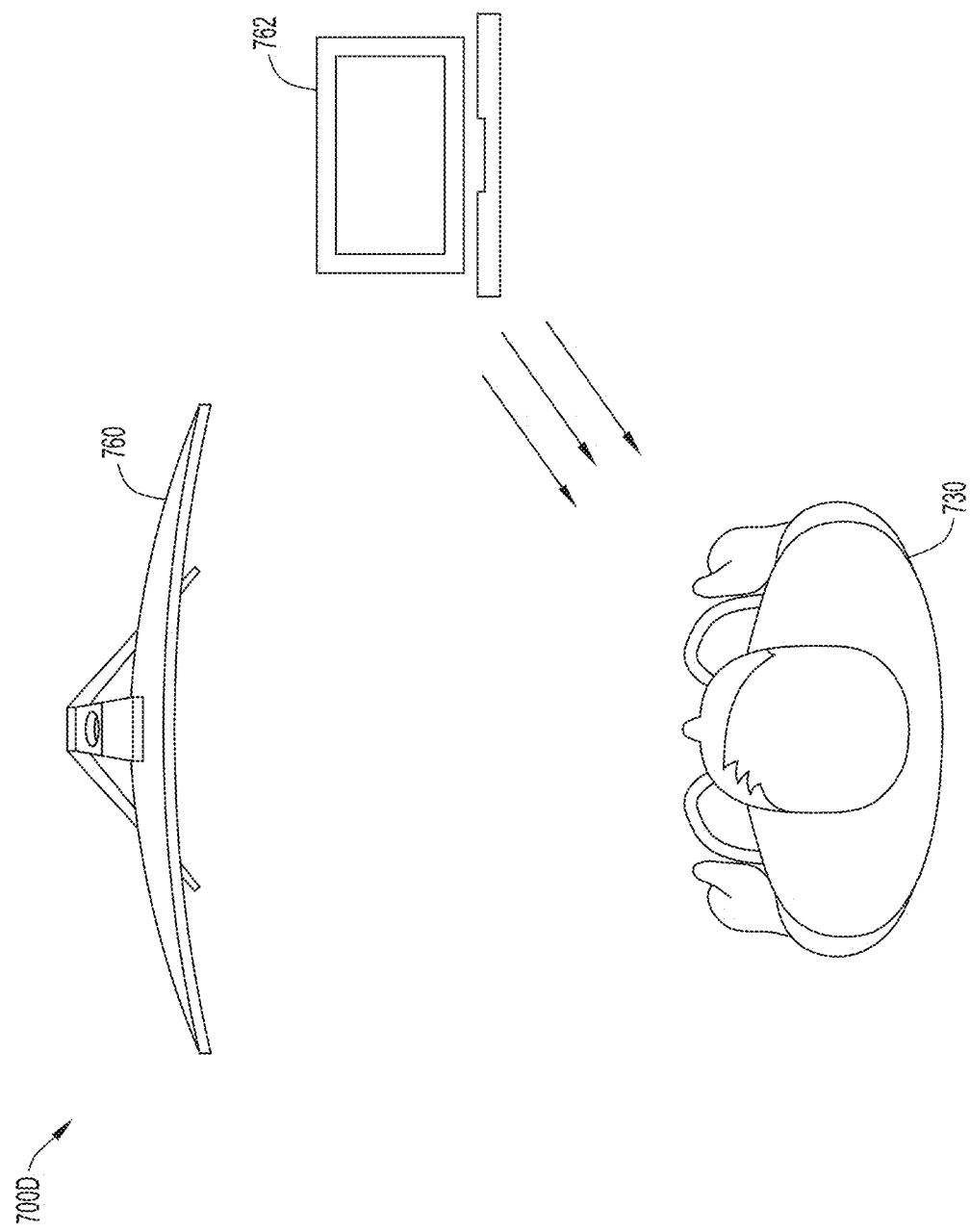

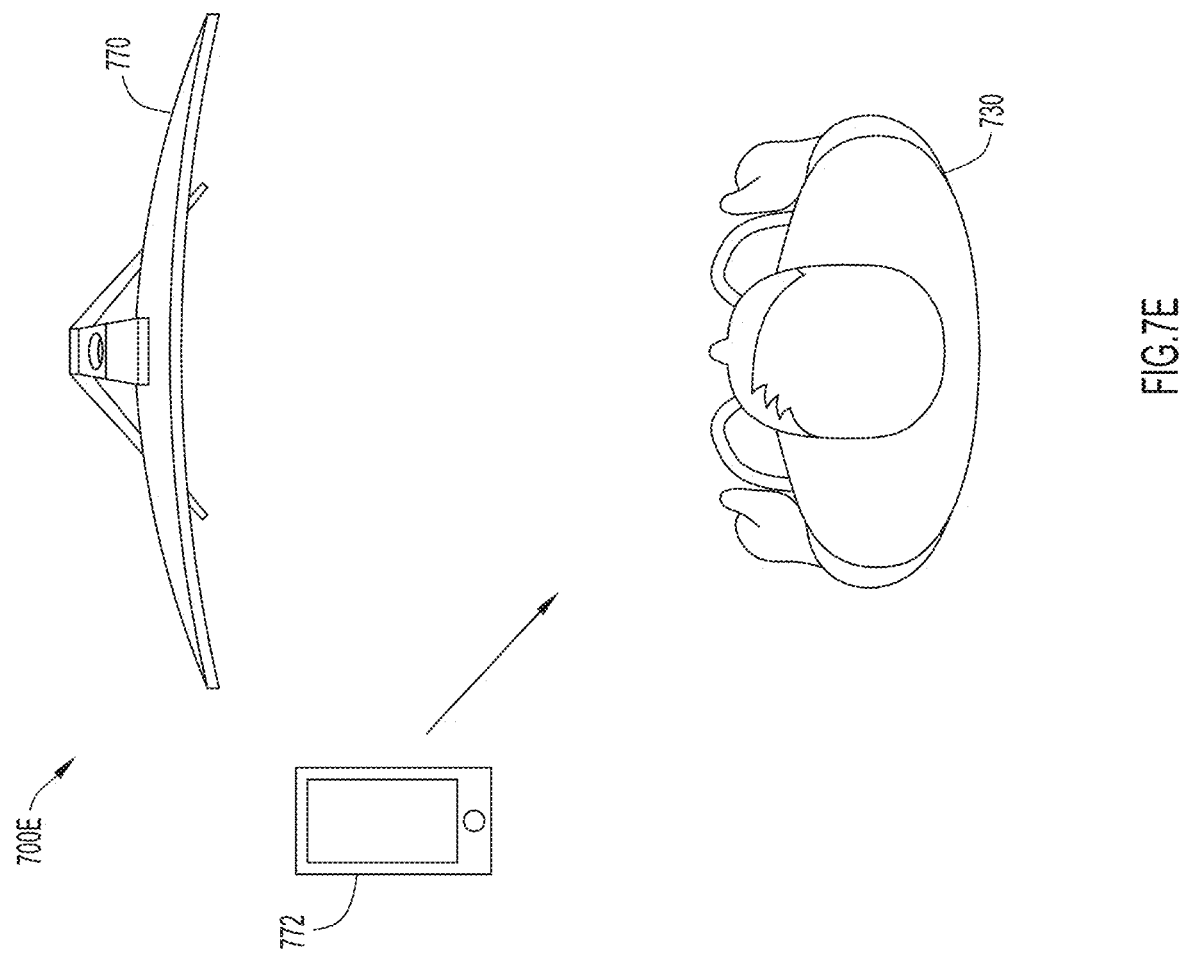

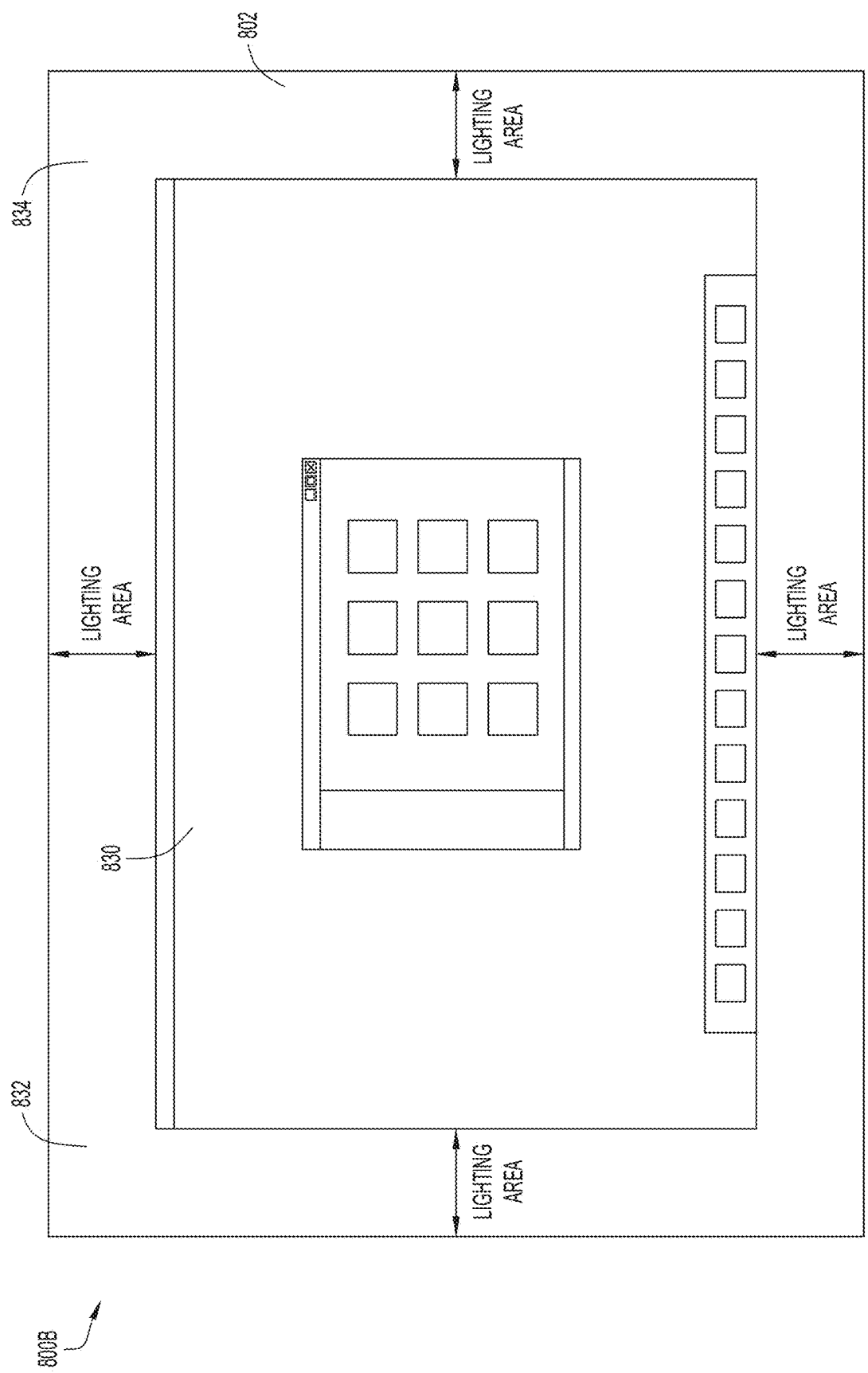

US 11,722,780 B2

1

INTELLIGENT CLOUD-ASSISTED VIDEO LIGHTING ADJUSTMENTS FOR CLOUD-BASED VIRTUAL MEETINGS

TECHNICAL FIELD

The present disclosure relates generally to video teleconferencing, and more particularly to techniques and mechanisms for providing intelligent cloud-assisted video lighting adjustments for cloud-based virtual meetings.

BACKGROUND

There are many amongst us who have participated in a virtual meeting (e.g. a virtual web-based or online meeting) where the lighting conditions for one or more of the participants were inadequate. In many instances, the lighting for the participants in a virtual meeting may be relatively dark. At these times, one may not be able to clearly see or identify other participants on the screen, especially in the case where the virtual meeting has a large number of participants.

In some cases, external lighting setups, such as video lighting setups and other lighting kit setups, may have to be purchased for the virtual meetings. These types of lighting setups are not environmentally friendly and may come at a cost to the user. Also, in today's post-pandemic era with everyone concerned about their health and wellness, it is desirable to provide lighting that is soothing and that will not cause eye strain, especially over relatively long virtual meetings.

BRIEF DESCRIPTION OF THE DRAWINGS

FIG. 3 is a high-level diagram of a system for a cloud-assisted lighting adjustment for a virtual meeting facilitated by a virtual meeting application according to some implementations of the present disclosure;

FIG. 4 is a flowchart for describing a method for use in a cloud-assisted adjustment of lighting of a video of a participant in a virtual meeting facilitated by a virtual meeting application of the user device with use of a selected display configuration;

FIGS. 7B-7E are examples of the plurality of display configurations associated with different lighting arrangements which may be used at the user device;

2

Figure 8A:
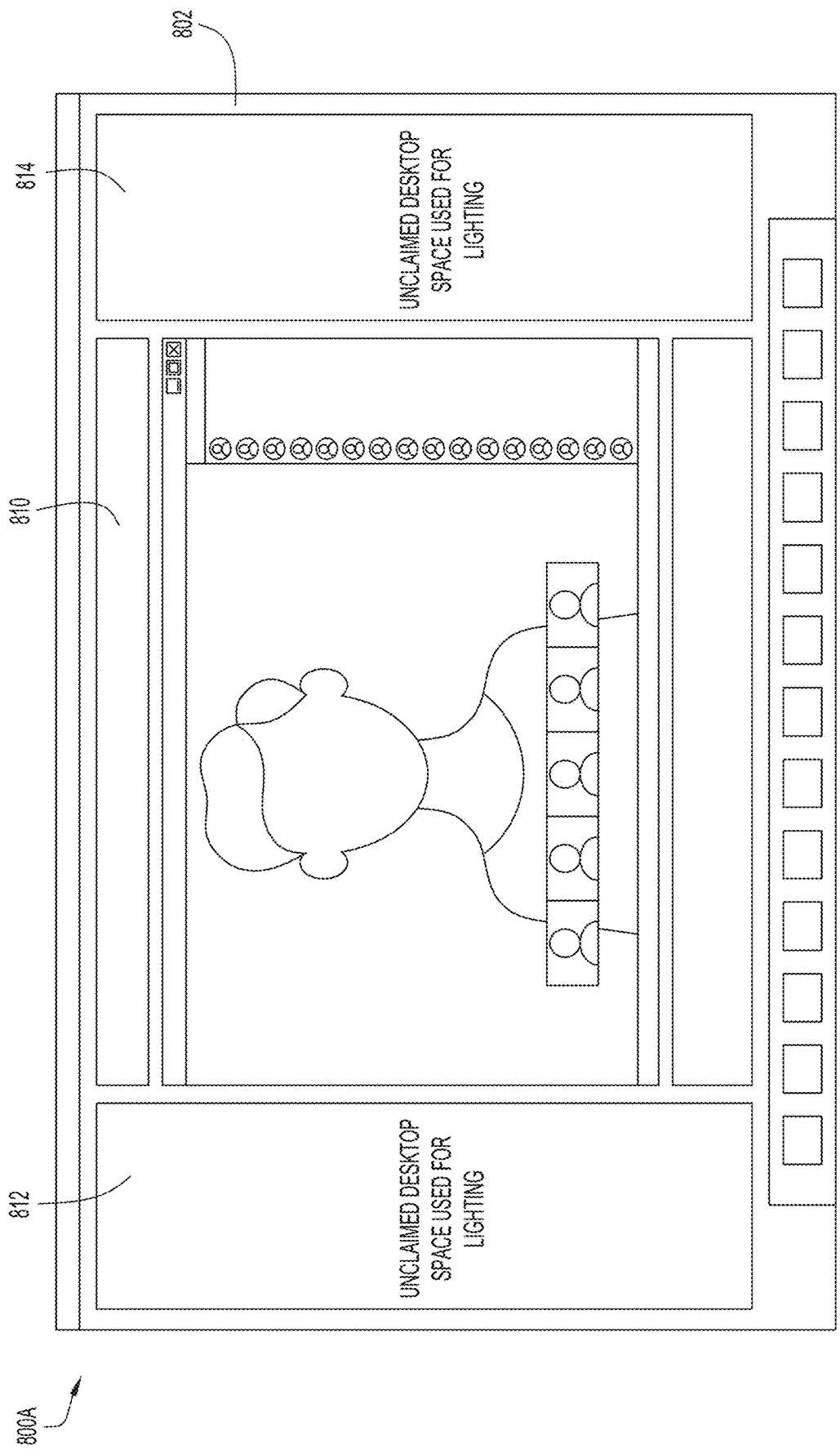
Figure 9:
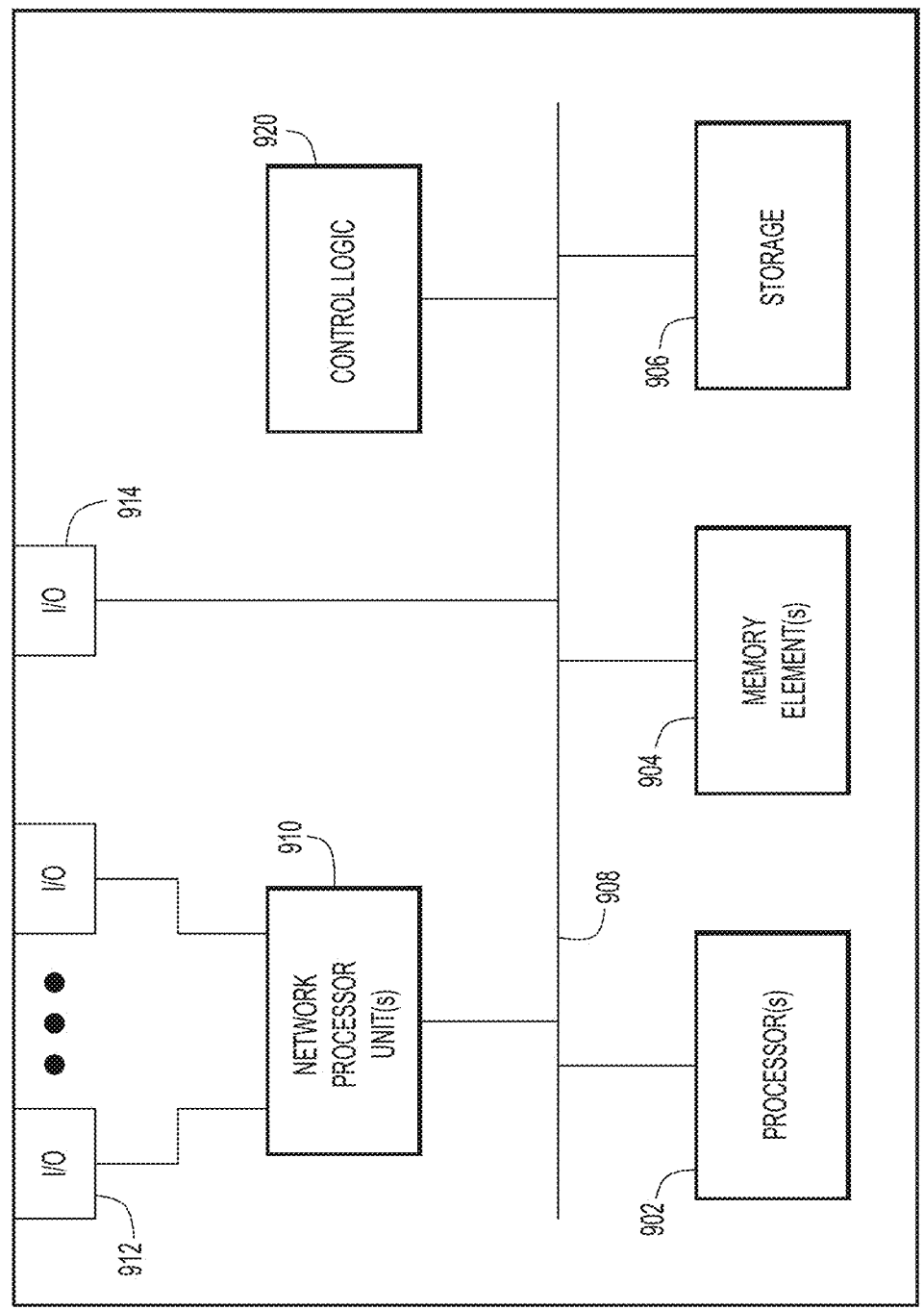

FIGS. 8A-8B are examples of different display configurations that are associated with different lighting techniques which may be utilized in a display of the user device;

FIG. 9 illustrates a hardware block diagram of a computing device that may perform functions associated with operations discussed herein.

DESCRIPTION OF EXAMPLE EMBODIMENTS

Overview

Techniques and mechanisms for providing intelligent cloud-assisted video lighting adjustments for cloud-based virtual meetings are described herein.

In one illustrative example, a user device is operative to adjust and optimize lighting of a video of a participant in a virtual meeting with use of a selected display configuration at the user device, with the assistance of a cloud server. The selected display configuration may be a selected from one of a plurality of display configurations (e.g. a user display of the device, a plurality of displays connected at the user device, the user display and an alternate display of a laptop or a tablet, etc.). The user device may receive, from the cloud server, baseline lighting setting parameters associated with the selected display configuration. The user device may apply the baseline lighting setting parameters to one or more displays of the selected display configuration at the user device. Using the baseline lighting setting parameters as a baseline, the user device may automatically adjust a brightness and/or color pixels of the one or more displays of the selected display configuration, for optimizing the lighting of the video of the participant.

More detailed and alternative techniques and implementations are provided herein as described below.

Example Embodiments

Presented herein are cloud-assisted techniques and mechanisms that allow for adjusting and optimizing lighting of a video of a participant in a virtual meeting facilitated by a virtual meeting application of the user device.

Figure 1:
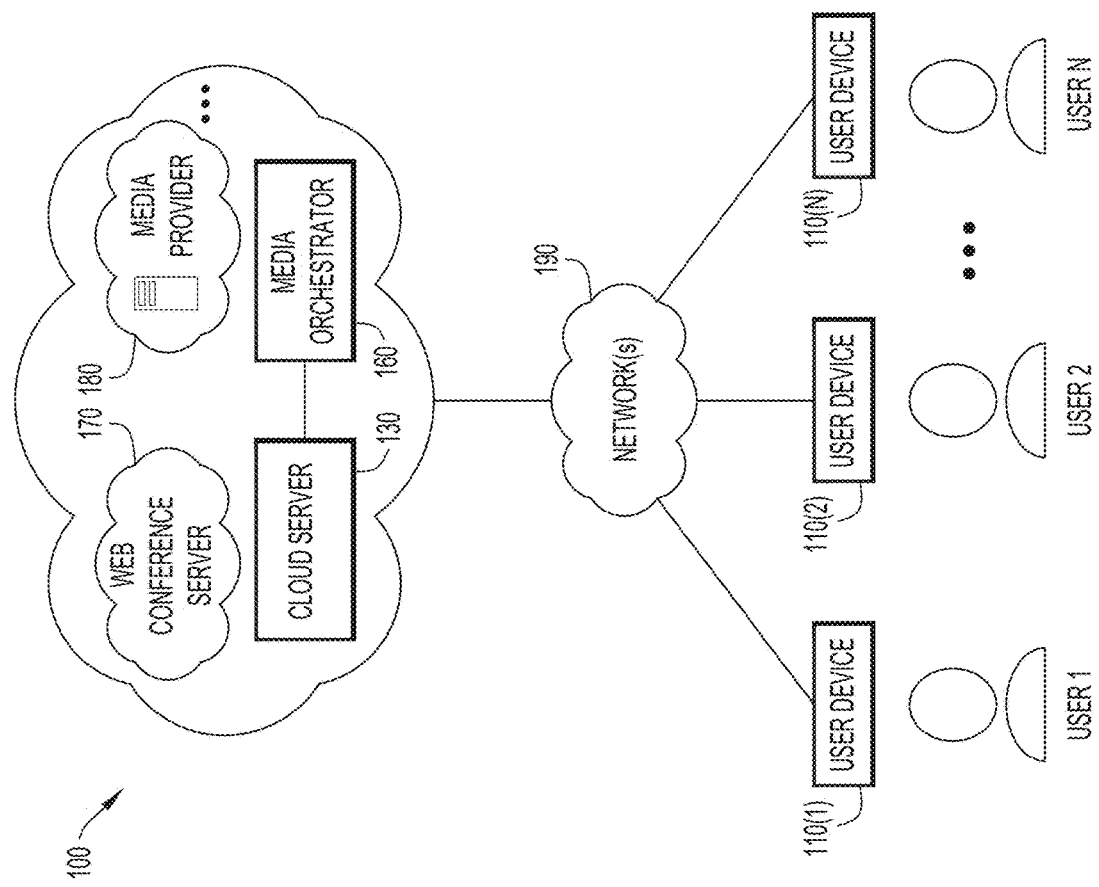
FIG. 1 is an illustrative representation of a basic network architecture within which a virtual meeting amongst a plurality of user devices may be facilitated according to some implementations of the present disclosure.

Referring first to FIG. 1, a diagram of a network environment 100 in which the techniques of the present disclosure may be carried out is shown. In FIG. 1, a plurality of user devices 110(1), 110(2), to 110(N) associated with a plurality of users (e.g. User 1, User 2, through User N) or participants of a virtual meeting are shown. User devices 110(1), 110(2), to 110(N) may take on a variety of forms, including a smartphone, a tablet, a laptop computer, a desktop computer, etc. User devices 110(1), 110(2), to 110(N) may communicate with various network-based entities shown in FIG. 1 via one or more networks 190.

Networked conferencing systems typically employ a client-server architecture, whereby each participant's client software (e.g. running on the participant's computer or work-station) connects to a web conference server 170. Amongst other functionality, web conference server 170 may include conference control services and access control services that govern access to conference functionality and/or resources. When a participant "logs in" to a virtual meeting, the participant's identification may determine permissions granted. When a host or moderator of the virtual meeting logs in, the host may be given the broadest access rights to control the virtual meeting. Web conference server 170 may control all communications with the various clients according to a set of permissions granted to the conference participant logged in on that client.

A media orchestrator 160 may ensure that all or select participants get connected to a meeting supported by a media provider 180 or, in the case of multiple media providers, to the appropriate one or more media providers. The functions of media orchestrator 160 and/or media provider(s) 180 may be performed by separate entities as shown, or may be integrated (either on-premises, in the cloud, or a hybrid of on-premises and cloud).

A cloud server 130 may include a lighting adjustment service for user devices 110(1), 110(2), to 110(N) for virtual meetings. More particularly, this cloud-assisted service may assist in the adjusting and optimizing of lighting of video of participants in the virtual meetings, with use of selected display configurations of user devices 110(1), 110(2), to 110(N). In FIG. 1, it is shown that cloud server 130, along with media orchestrator 160, web conference server 170, and media provider 180, may reside off-premises in a cloud or data center computing environment. In some implementations, cloud server 130 may reside on-premises.

Figure 2:
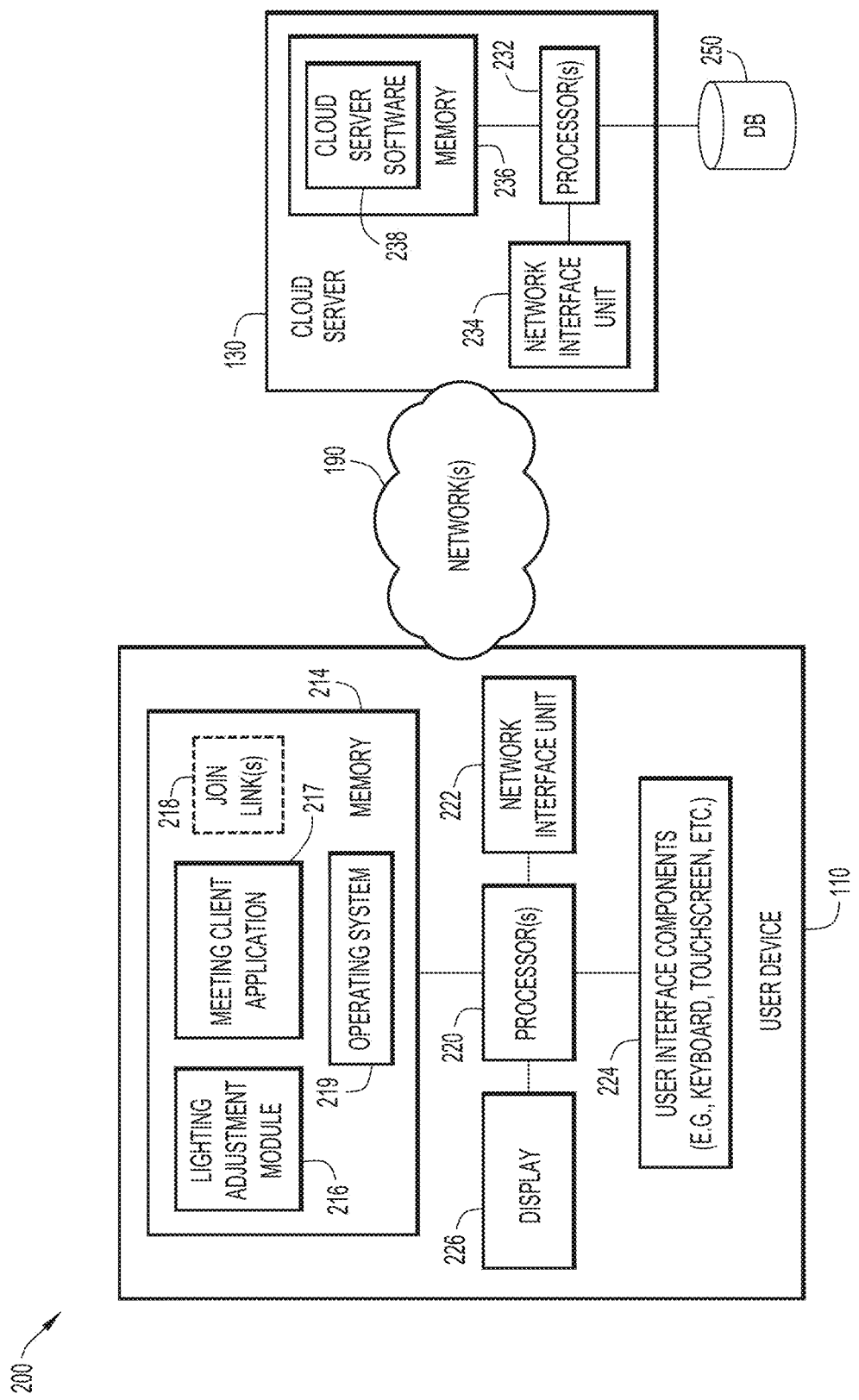
FIG. 2 is an illustrative representation of a user device and a cloud server for use in the virtual meeting according to some implementations of the present disclosure.

FIG. 2 is a block diagram 200 of a user device 110 (one of user devices 110(1), 110(2), to 110(N) of FIG. 1) and cloud server 130 which are configured to connect to one or more networks 190 for network-based communication. As shown, user device 110 may include one or more processors 220 (e.g., a microprocessor or microcontroller), a network interface unit 222 that enables wired and/or wireless network communication, one or more user interface components 224 (e.g., keyboard, mouse, touchscreen, etc.), and at least one display screen/monitor. User device 110 may also include a memory 214 for storing software instructions of a lighting adjustment module 216, a meeting client application 217 (e.g. a virtual meeting application), and one or more join links 218. For the sake of completeness, FIG. 2 also shows an operating system 219 on which lighting adjustment module 216 and meeting client application 217 may run.

Cloud server 130 of FIG. 2 may include one or more processors 232, a network interface unit 234 and a memory 236. Memory 236 may store instructions of cloud server software 238 for the lighting adjustment service. Memory 214 and memory 236 may include read-only memory (ROM), random-access memory (RAM), magnetic disk storage media devices, optical storage media devices, flash memory devices, electrical, optical, or other physical/tangible memory storage devices. In general, memory 236 shown in FIG. 2 may include one or more tangible (non-transitory) computer readable storage media encoded with software comprising computer executable instructions that, when executed by the one or more processors 232, causes the operations as described herein to be performed.

As described herein, the techniques and mechanisms of the present disclosure may involve use of lighting adjustment module 216 on user device 110, which may be referred to as an Intelligent Digital Lighting Adjustment (IDLA) module. With assistance of cloud server 130, lighting adjustment module 216 may be operative to adjust light automatically and intelligently on existing monitors and laptop screens of the participant's device during a video teleconference meeting or "virtual meeting" in response to ambient light conditions.

In some implementations, lighting adjustment module 216 may be designed to be an additional part of meeting client application 217 (e.g. Cisco WebEx Meetings) installed on a participant's computer, for example, to control the settings of a selected display configuration. The selected display configuration may include display 226 (or e.g. touchscreen) of user device 110, an external monitor, a laptop screen, a multi-display/screen configuration, etc. Notably, a variety of different types of screen/monitor configurations may be selected from and utilized for video lighting at user device 110. For improved lighting, lighting adjustment module 216 may interface and communicate with the cloud server 130 in associated with user display profiles (e.g. display and/or configuration profiles) associated with the participant (e.g. even for a plurality of participants in the video teleconference).

FIG. 3 is a high-level diagram of a system 300 for a cloud-assisted lighting adjustment for a virtual meeting facilitated by a virtual meeting application according to some implementations of the present disclosure. In FIG. 3, lighting adjustment module 216 may utilize a selected display configuration 310 associated with user device 110 to provide lighting and associated adjustments for the participant of the virtual meeting. Lighting adjustment module 216 may receive lighting adjustment assistance from cloud server 130 which is provided in a cloud 302. Cloud server 130 has access to a database 250 which stores user display profiles having lighting setting parameters for different display configurations associated with the participants. Lighting adjustment may be performed such that an unoptimized, poorly-lit video presentation 320 of a virtual meeting may be converted into an optimized, well-lit video presentation 322. At least in some cases, which will depend on the user's setup as well as the user's selection, the selected display configuration 310 will utilize the lighting provided via (at least) display 226 (or e.g. touchscreen) of user device 110 of FIG. 2.

In some implementations, lighting adjustment module 216 may be operative to utilize an ambient light sensor associated with user device 110 in order to assess the existing ambient conditions or lighting environment associated with the participant. In preferred implementations, the ambient light sensor may be a built-in light sensor of user device 110 (e.g. in MAC OS X and WINDOWS) for measuring the brightness of the light in a room, in order to adjust the brightness and other parameters in the selected display configuration 310 associated with user device 110. In some implementations, lighting adjustment module 216 may be operative to utilize the same brightness control that can be manually-controlled with a laptop's physical buttons or screen: using a Display Data Channel (DDC). Using DDC allows for more advanced features (e.g. setting brightness to 30%) and others directly with respect to improving color rendering, power consumption, backlight bleeding effect.

To illustrate by example, studies have shown that people tend to look the best when illuminated by light that measures warm (e.g. around 2700 kelvins). Most people prefer a warm, bluish glow, as such coloring appears as natural lighting to make people feel more "at home" on their computers. In some implementations, it is desired is to replicate such effects with use of lighting adjustment module 216 for an intelligent adjustment of the brightness and other lighting parameters, so that a user may be illuminated in a consistent and pleasing way throughout a virtual meeting.

With selected display configuration 310, one of a variety of different types of screen or monitor configurations of user device 110 may be selected from for video lighting (e.g. the use of a multi-screen display configuration screen for video lighting). Such options are considered to be very desirable or important, especially considering that in many instances the lighting provided from a single display is insufficient. Thus, lighting adjustment module 216 may utilize existing monitors or laptop screens as a light source to provide lightning during a video teleconference meeting for a warm, well-lit video look for a user's face.

In some implementations, lighting adjustment module 216 may utilize video-based sensing technologies, such as deep learning algorithms and machine vision techniques, to enhance the quality of a virtual meeting, by intelligently adjusting digital light from screens or monitors to provide a consistent and balanced illumination throughout the duration of the virtual meeting. This may be achieved using existing monitor or laptop screens whose settings can be dynamically modified so they can emit the appropriate amount of light when needed based on sensor data collected within the room.

As an alternative to local control (e.g. a desktop application), cloud-based or cloud-assisted control may be utilized as needed and described herein. In some implementations, cloud server 130 may maintain and store user display profiles associated with each one of a plurality of users or participants. In a user display profile, baseline lighting setting parameters associated with selected display configuration 310 for each user device may be stored. At the outset of a virtual meeting, lighting adjustment module 216 may receive and apply the baseline lighting setting parameters to one or more displays of the selected display configuration. Using the baseline lighting setting parameters as a baseline, lighting adjustment module 216 may adjust the brightness and/or color pixels of the one or more displays of selected display configuration 310, for optimizing the lighting of the video of the participant. In some further implementations, cloud-based control may provide an operation to normalize the lighting for all participants when multiple individuals are presenting in the virtual meeting.

A more detailed description of the technique and mechanisms of the present disclosure is now provided. In particular, it has been recognized that the supply of light that emanates from a computer's display screen(s) depends on two different factors: (1) the overall brightness (e.g. often the backlight brightness) of the screen; and (2) the color and brightness of the individual pixels corresponding to the currently displayed content on the screen.

For controlling the overall brightness per (1) above, lighting adjustment module 216 may utilize DDC. DDC is a technology that is supported by most computer monitors for allowing software control of the brightness in the same way it is manually controlled by a user (via buttons integrated into the display or laptop keyboard). For controlling the pixel values per (2) above, lighting adjustment module 216 may be operative to employ one or more of a plurality of different strategies as follows:

(a) When the video teleconference application has focus, the background hue or brightness of the application's background may be varied in order to create the desired lighting characteristics. In addition, existing background matting or replacement technologies (e.g. virtual background) may be used to change the background of participants, thereby increasing the proportion of pixels that can be controlled for lighting purposes. One example of this strategy is shown and described later in relation to FIG. 8A.

(b) When the video teleconference meeting does not have focus, the screen size where the desktop content is displayed may be reduced to thereby create a border (or one or more border areas) around the display. The pixel values within the border may then be adjusted to control available lighting. One example of this strategy is shown and described later in relation to FIG. 8B.

(c) A display theme may be switched from "dark" to "light" during the virtual meeting, automatically or manually enabled by the user.

(d) If multiple display screens are available, the secondary (or tertiary, etc.) displays or screens may be utilized, overridden completely or, in the alternative, partially as described in (a) and (b) above, in order to provide controllable lighting pixels. One example of this strategy is shown and described later in relation to FIGS. 7C and/or 7D.

(e) If mobile devices (e.g. cellular phones, smartphones, or tablet computers) are available, companion software may be made available on those devices to use them for lighting which may be adjusted. One example of this strategy is shown and described later in relation to FIG. 7E.

With reference now to FIG. 4, a flowchart 400 is shown for describing a method for a cloud-assisted adjustment of lighting of a video of a participant in a virtual meeting facilitated by a virtual meeting application according to some implementations. The method of FIG. 4 may be performed by a user device having the virtual meeting application and interacting with a server (e.g. a cloud server). More particularly, the method may be performed at least in part by a lighting adjustment module of the user device which interacts with the cloud server. The method may be embodied as a computer program product including a non-transitory computer readable medium (e.g. one or more memory elements) and instructions stored in the computer readable medium, where the instructions are executable on one or more processors for performing the steps of the method.

Beginning at a start block 402, the user device may receive, from the cloud server, baseline lighting setting parameters associated with a selected display configuration at the user device (step 404 of FIG. 4). The selected display configuration may be a selected one of a plurality of display configurations. For example, the selected display configuration may be a user display of the user device; a plurality of displays connected at the user device; the user display of the user device and an alternate display of a laptop or a tablet, the user display of the user device and a mobile display of a mobile device, etc. The baseline setting parameters may be received in response to the user device sending to the cloud server a message which indicates a request for the baseline lighting setting parameters. Upon receipt, the user device may apply the baseline lighting setting parameters to one or more displays of the selected display configuration at the user device (step 406 of FIG. 4). Using the baseline lighting setting parameters as a baseline, the user device may adjust the brightness and/or color pixels of the one or more displays of the selected display configuration at the user device, for optimizing the lighting of the video of the participant (step 408 of FIG. 4). In some implementations, the user device may obtain lighting environment parameters based on sensing a lighting environment of the user device (e.g. with use of one or more sensors of the user device), and may adjust the brightness and/or the color pixels of the one or more displays of the selected display configuration according to the lighting environment parameters.

In some implementations, the user device may send, to the cloud server, display configuration information associated with the selected display configuration at the user device. In some implementations, the display configuration information may include a display configuration setting value for (properly or uniquely) identifying the selected display configuration. In some implementations, the display configuration information may (further) include one or more of a number of displays, an arrangement of displays, and display make and model information. In some implementations, the user device may cause a user display prompt to be displayed, where the user display prompt indicates the plurality of display configurations for user selection. The user device may receive a user selection of the selected display configuration, and then send to the cloud server a message which indicates the selected display configuration for storage in a user display profile.

Further, in some implementations, the cloud server may receive from the user device a message which indicates lighting setting parameters associated with the optimizing of the lighting of the video of the participant, and store, in the user profile, the lighting setting parameters in association with the selected display configuration. The lighting setting parameters may be for subsequent use by the user device as the baseline lighting setting parameters for the selected display configuration. The message which indicates lighting setting parameters may further indicate lighting environment parameters associated with a lighting environment of the user device.

In some implementations, the cloud server may store a plurality of baseline lighting setting parameters respectively associated with the plurality of display configurations, based on lighting setting parameters received from a plurality of user devices respectively associated with a plurality of participants. In some further implementations, the cloud server may utilize a machine learning process to generate a plurality of (more optimal) baseline lighting setting parameters respectively associated with the plurality of display configurations, based on the lighting setting parameters received from the plurality of user devices.

Figure 5A:
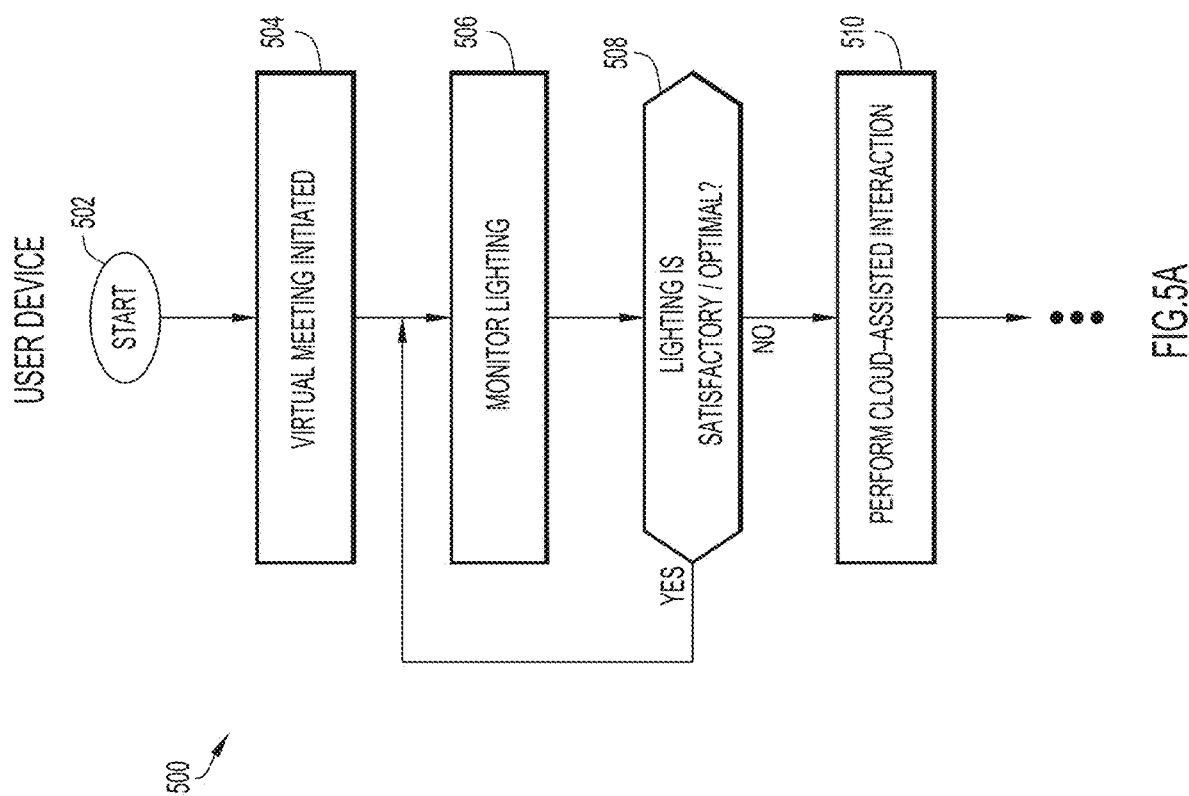
FIGS. 5A-5B form a flowchart for describing a method for use in a cloud-assisted adjustment of a video of a participant in a virtual meeting facilitated by a virtual meeting application of the user device with use of a selected display configuration.
Figure 5B:
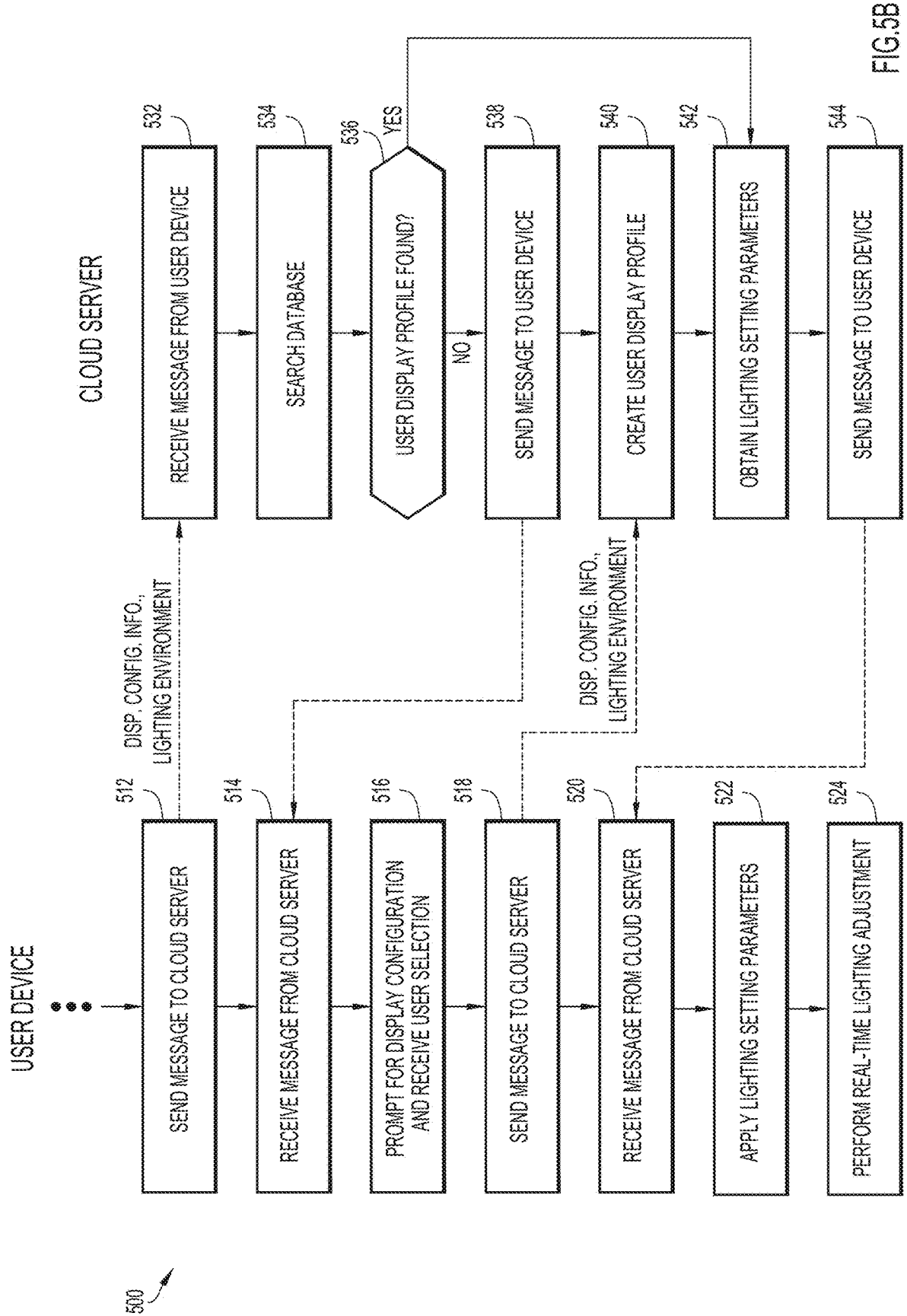

FIGS. 5A-5B form a flowchart 500 for describing a method for a cloud-assisted adjustment of lighting of a video of a participant in a virtual meeting facilitated by a virtual meeting application according to some implementations. The method of FIG. 5A-5B may be performed by a user device having the virtual meeting application and interacting with a server (e.g. a cloud server). More particularly, the method may be performed at least in part by a lighting adjustment module of the user device which interacts with the cloud server. The method may be embodied as a computer program product including a non-transitory computer readable medium (e.g. one or more memory elements) and instructions stored in the computer readable medium, where the instructions are executable on one or more processors for performing the steps of the method.

Beginning at a start block 502 of FIG. 5A, a virtual meeting is initiated (step 504 of FIG. 5A). A user of the user device having the virtual meeting application is one of the participants in the virtual meeting. The user device may monitor the lighting of a video of the participant of the virtual meeting (e.g. an ambient light sensor, for assessing the participant's lighting environment) (step 506 of FIG. 5A). If the lighting is identified to be satisfactory or optimal (as tested at step 508 of FIG. 5A), the user device may continue to monitor the lighting at step 506. On the other hand, if the lighting is identified to be unsatisfactory or not optimal (as tested at step 508 of FIG. 5A), the user device may proceed to perform a cloud-assisted interaction with the lighting adjustment module of the user device (step 510 of FIG. 5A). The method may continued in FIG. 5B.

Continuing with the flowchart 500 of FIG. 5B, in response to lighting that is unsatisfactory or less than optimal, the user device may send a message to the cloud server (step 512 of FIG. 5B). In some implementations, the message may indicate (implicitly or explicitly) a request for baseline lighting setting parameters for its display configuration. In some implementations, the message may include one or more of an identity associated with the user device, display configuration information of the user device, and lighting environment parameters which indicate the lighting environment of the user device. In some implementations, the display configuration information may include a display configuration setting value for (properly or uniquely) identifying the selected display configuration. In some implementations, the display configuration information may (further) include one or more of a number of displays, an arrangement of displays, and display make and model information.

The cloud server may receive the message from the user device (step 532 of FIG. 5B). In response to receipt of the message, the cloud server may search a database for identifying a user display profile associated with the user device or user thereof (step 534 of FIG. 5B). If the user display profile is not found in the database (as tested in step 536 of FIG. 5B), then the cloud server may send a message to the user device (step 538 of FIG. 5B). In some implementations, the message may indicate a request for user selection of a display configuration.

The user device may receive the message from the cloud server (step 514 of FIG. 5B), cause a user display prompt to be displayed, where the user display prompt indicates a plurality of display configurations for user selection, and receive a user selection of one of the plurality of display configurations in the user display prompt (step 516 of FIG. 5B). In response to the user selection, the user device may send a message to the cloud server (step 518 of FIG. 5B). In some implementations, the message may indicate the selected display configuration for storage in a user display profile. In some implementations, the message may indicate the selected display configuration and lighting environment parameters which indicate the lighting environment of the user device.

The cloud server may receive the message from the user device and create a user display profile based on the selected display configuration (step 540 of FIG. 5B). The cloud server may also obtain lighting setting parameters (step 542 of FIG. 5B), which may be generated or selected based on the lighting environment parameters received from the user device. In some implementations, this process may utilize a model or model function at the cloud server, one example of which is shown and described later in relation to FIG. 6. In some implementations, the lighting setting parameters are baseline lighting setting parameters for use as a baseline at the user device. Alternatively, the baseline lighting setting parameters may be obtained from the user display profile if and when found in step 536 of FIG. 5B.

The cloud server may then send a message to the user device (step 544 of FIG. 5B). In some implementations, the message may include the baseline lighting setting parameters. The user device may receive the message which includes the baseline lighting setting parameters (step 520 of FIG. 5B). The user device may apply the baseline lighting setting parameters to one or more display of the selected display configuration at the user device (step 522 of FIG. 5B). Using the baseline lighting setting parameters as a baseline, the user device may adjust a brightness and/or color pixels of the one or more displays of the selected display configuration for optimizing the lighting of the video of the participant (step 524 of FIG. 5B).

Figure 6:
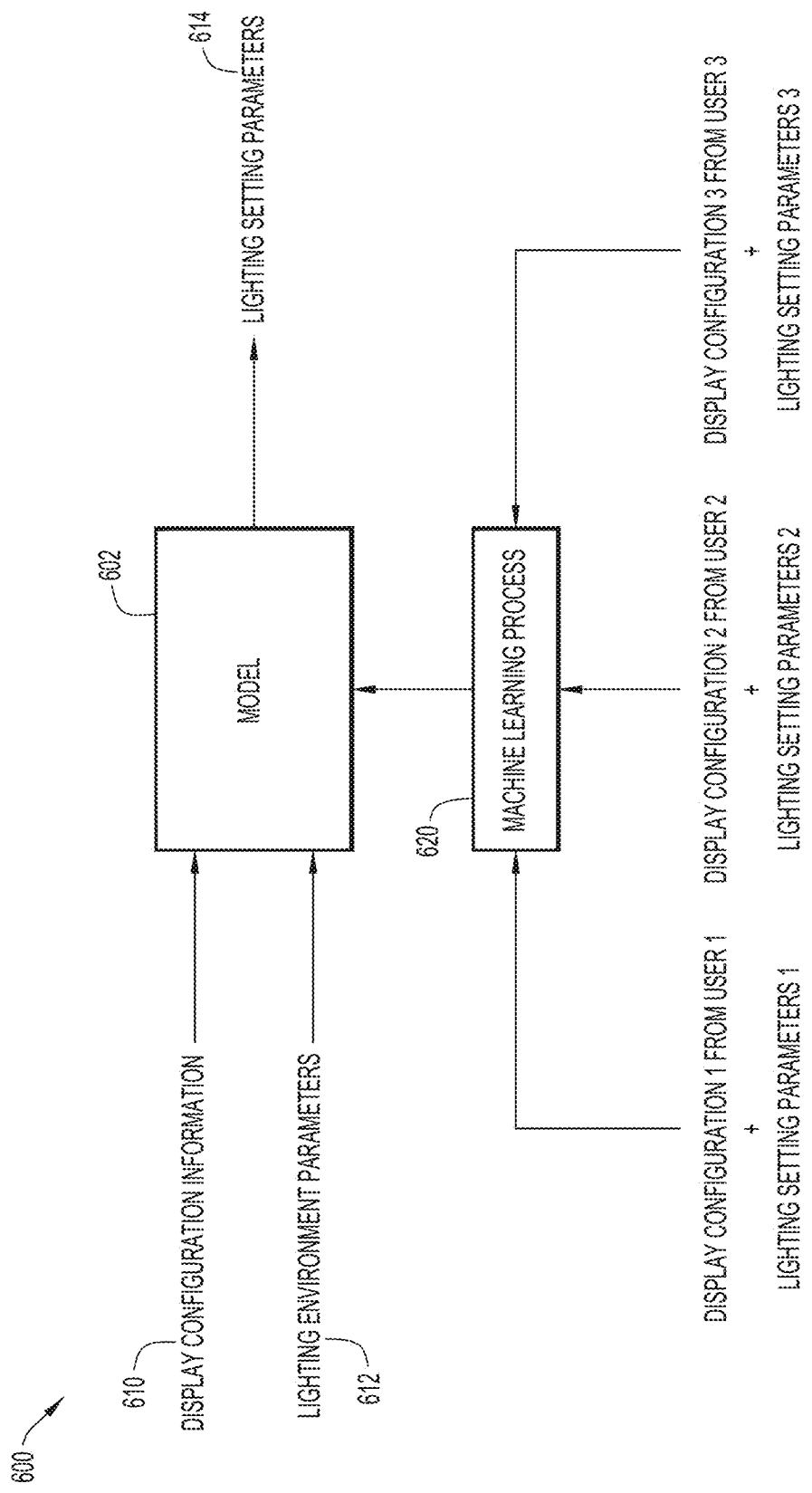
FIG. 6 is a block diagram of a process which utilizes a model for generating or selecting baseline lighting setting parameters for displays and/or display configurations, and a machine learning process for training the model.

FIG. 6 is a block diagram of a process 600 which utilizes a model 602 (or model function) for generating or selecting lighting setting parameters for displays and/or display configurations, and a machine learning process 620 which may be used for training the model 602. The process 600 shown in FIG. 6 may be utilized at the cloud server and performed in response to communications with user devices. Model 602 may receive, as inputs, display configuration information 610 of a selected display configuration (e.g. a single or multiple display configuration) at a user device and lighting environment parameters 612 of the lighting environment at the user device. Model 602 may generate or select, as an output, lighting setting parameters 614 for one or more displays of the selected display configuration at the user device. In some implementations, the lighting setting parameters may be baseline lighting setting parameters for use as a baseline for the selected display configuration and the associated lighting environment. In some implementations, the lighting setting parameters may be optimal lighting setting parameters for optimized lighting for the selected display configuration and the associated lighting environment.

Machine learning process 620 may be used for training the model 602 according to input information 630 associated with different users, where the input information 630 may include display configuration information and lighting setting parameters. For example, as shown in FIG. 6, input information 630 may include display configuration information 1 for user 1 and associated lighting setting parameters 1; display configuration information 2 for user 2 and associated lighting setting parameters 2; and display configuration information 3 for user 3 and associated lighting setting parameters 3, etc.

Figure 7A:
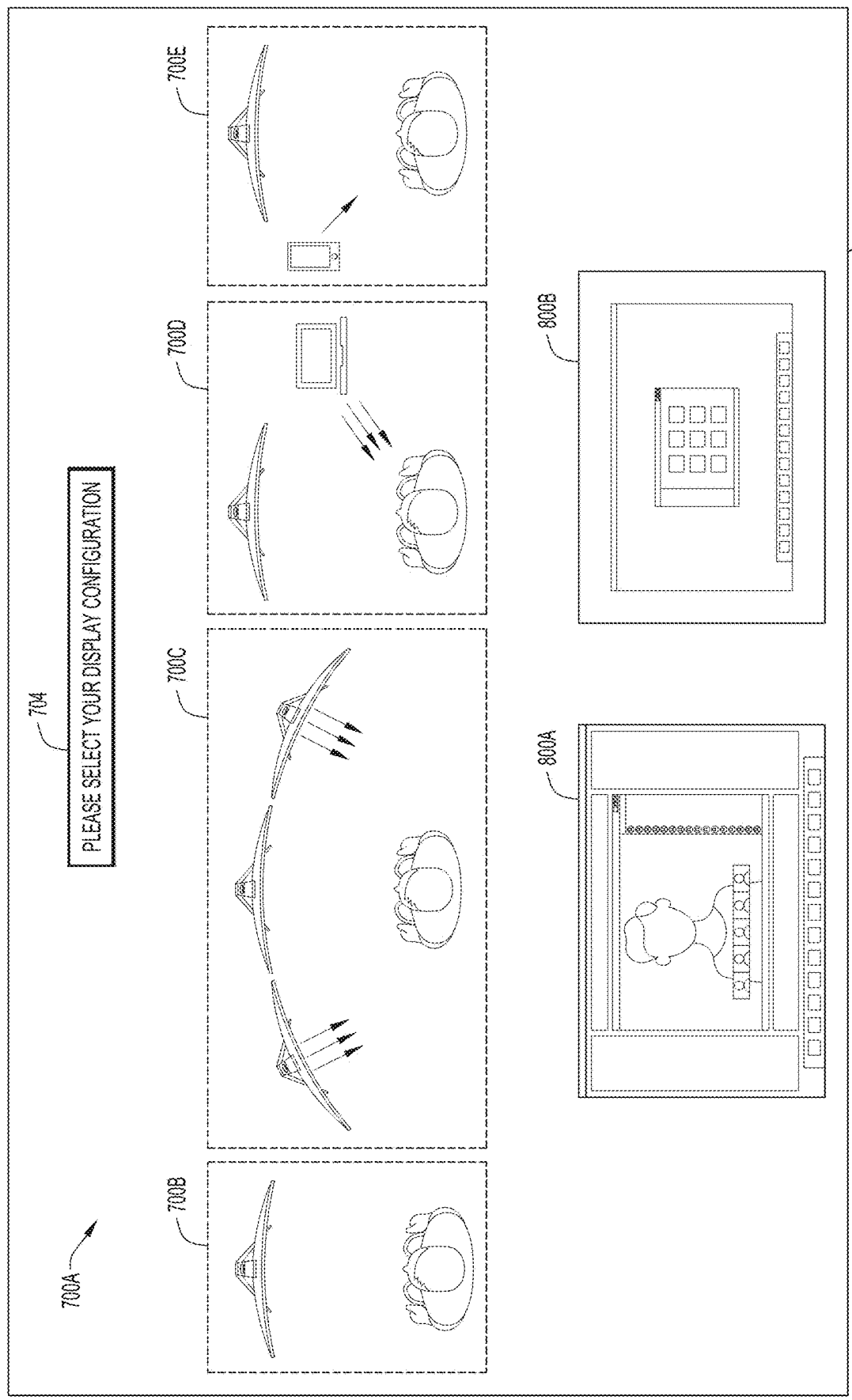
FIG. 7A is an example of a user display prompt for display at a user device, where the user display prompt indicates a plurality of display configurations, at least one of which may be selected for use at the user device.

FIG. 7A is an example of a user display prompt 702 for display at a user device, where the user display prompt 702 indicates a plurality of display configurations 700A. In some implementations, at least one of the plurality of display configurations 700A shown may be selected at the user device for use in lighting adjustment.

In the example of FIG. 7A, user display prompt 702 may include a text instruction 704 (e.g. "PLEASE SELECT YOUR DISPLAY CONFIGURATION") as well as visual indications. The plurality of display configurations 700A shown in FIG. 7A include (e.g. visual indications of) a display configuration 700B (e.g. for a single user display of the user device), a display configuration 700C (e.g. for a plurality of displays connected at the user device), a display configuration 700D (e.g. for the user display of the user device and an alternate display of a laptop or a tablet), and a display configuration 700E (e.g. for the user display of the user device and a mobile display of a mobile device).

In FIG. 7A, the plurality of display configurations 700A may further include (e.g. visual indications of) a display configuration 800A for a user display (e.g. for the use of unclaimed desktop space as shown and described herein) and a display configuration 800B for a user display (e.g. for use of area outside the border of a reduced-sized desktop as shown and described herein). Note that each display in a multiple display configuration may be used exclusively for lighting or, in the alternative, only partially in accordance with one of display configurations 800A and 800B of FIGS. 8A and 8B, respectively.

FIGS. 7B-7E are examples of the plurality of display configurations which may be utilized at a user device, as indicated for user selection in the user display prompt of FIG. 7A.

In FIG. 7B, display configuration 700B shows a user 730 positioned in relation to a (single) user display 740 which may be utilized for both presenting the virtual meeting and for lighting. Here, lighting in display configuration 700B may be provided as described in relation to display configuration 800A of FIG. 8A or display configuration 800B of FIG. 8B (with lighting adjustments if and as needed).

In FIG. 7C, display configuration 700C shows user 730 positioned in relation to a plurality of displays 750, 752, and 754 (e.g. cable-connected), where display 752 may be utilized for presenting the virtual meeting and (surrounding) displays 750 and 754 may be utilized for lighting (with lighting adjustments if and as needed). In some implementations, display 752 is utilized exclusively for the virtual meeting and displays 750 and 754 are utilized exclusively for lighting (with lighting adjustments if and as needed). In other implementations, each one of displays 750, 752, and 754 may be only partially used for lighting in accordance with one of display configuration 800A of FIG. 8A or display configuration 800B of FIG. 8B (with lighting adjustments if and as needed).

In FIG. 7D, display configuration 700D shows user 730 positioned in relation to a user display 760 of the user device for presenting the virtual meeting and an alternate display 762 of a laptop or a tablet computer for lighting. In some implementations, user display 760 is utilized exclusively for the virtual meeting and alternate display 762 is utilized exclusively for lighting (with lighting adjustments if and as needed). In other implementations, each one of user display 760 and alternate display 762 may be only partially used for lighting in accordance with one of display configuration 800A of FIG. 8A or display configuration 800B of FIG. 8B (with lighting adjustments if and as needed).

In FIG. 7E, display configuration 700E shows user 730 positioned in relation to a user display 770 of the user device presenting the virtual meeting and a mobile display 772 of a mobile device of user 730 for lighting. In some implementations, user display 770 is utilized exclusively for the virtual meeting and mobile display 772 is utilized exclusively for lighting (with lighting adjustments if and as needed). In other implementations, mobile display 772 is utilized exclusively for the virtual meeting and user display 770 is utilized exclusively for lighting (with lighting adjustments if and as needed). In yet other implementations, each one of user display 770 and mobile display 772 may be only partially used for lighting in accordance with one of display configuration 800A of FIG. 8A or display configuration 800B of FIG. 8B (with lighting adjustments if and as needed).

FIGS. 8A-8B are examples of different display configurations 800A-800B, respectively, associated with different lighting techniques which may be utilized in a display 802 of the user device. In a lighting technique of display configuration 800A of FIG. 8A, a used desktop space 810 may display the presentation for the virtual meeting and unused desktop spaces 812 and 814 may be utilized for lighting. In a lighting technique associated with display configuration 800B of FIG. 8B, a used desktop space 830 may display the presentation for the virtual meeting and areas 832 and 834 outside the border of an adjusted, reduced-sized desktop may be utilized for lighting.

What is now described are examples of the above-described strategies put in use according to some implementations. When lighting conditions are identified to be insufficient for a well-lit, video teleconference meeting (or "virtual meeting"), lighting adjustment functionality of the lighting adjustment module associated with the video teleconference application (e.g. Cisco WebEx Meetings) may be triggered. The user device may be associated with a display(s) that is connected to or built-into the user device. The lighting adjustment module may retrieve previously-saved baseline lighting settings from a user display profile associated with the user. The profile may be a cloud profile which is stored in the cloud and retrieved via a cloud server.

Whenever a previously-used display or display configuration is connected and detected, setting parameters, such as display brightness, range, offset, temperature, and/or backlight (e.g. for monitors that support backlight), may be downloaded as a part of the profile. The profile may include the monitor's calibration profile settings and the user's previously-saved environment settings.

Especially for a first time user or first time use, the lighting adjustment module may cause a "Display Layout" prompt to be displayed (see e.g. FIG. 7A) for user selection based on a current set-up of the user. The lighting adjustment module may perform a lookup, in a cloud-connected database, for settings/parameters associated with the selected display configuration. This may be done in order to determine if there have been any previous instances of the display settings/parameters, for example, by other users as a baseline or initial settings value. Here, the cloud-connected database may store all monitor display profiles and optimal configurations for rendering well-lit video. In some implementations, a machine learning model may repeatedly update these baseline settings for training the model. Here, data may be regularly captured and analyzed from a plurality of virtual meetings, and/or from a plurality of display configurations of a plurality of different users, in order to train the model.

The lighting adjustment module may use the baseline lighting settings as a baseline for making adjustments. As the lighting adjustment module runs in the background, it may analyze and evaluate the user's current (lighting) environment using the data captured from an ambient light sensor (e.g. the built-in sensor on all new laptops and monitors), as well as the screen pixels to account for the applications being shared, in order to optimize the display brightness and temperature. The machine learning model may utilize the data captured for dynamically adjusting the display settings to ensure that the video output is well-lit throughout the entire virtual meeting (e.g. even if the user ambient lighting or on-screen application changes during this interval).

According to the present disclosure, in one method, the lighting adjustment module may first examine to utilize the unused screen space around the monitor (see e.g. FIG. 8A) to illuminate the person to a consistent and pleasing glow. If the above unused screen space is not feasible, or if the virtual meeting does not have focus, the screen size where desktop content is displayed may be decreased, creating a border or edge around the display, whose pixel values may be changed in order to control the level of illumination (see e.g. FIG. 8B).

If, however, the lighting adjustment module determines that the brightness controls for the existing monitor are at a maximum value (e.g. saturated) and cannot be altered further, the lighting adjustment module may check for the presence of a secondary display (such as a secondary monitor or laptop's screen). Here, the user may be prompted with the "Display Layout" options (see e.g. FIG. 7A) to select a different display configuration, which may include one or more secondary displays or screens (see e.g. FIGS. 7C and 7D, and optionally FIG. 7E). If a secondary monitor or laptop screen is detected, and/or the user selects a (e.g. new) display configuration, the lighting adjustment module will automatically and adaptively adjust brightness and temperature throughout the meeting for the selected display configuration with respect to its multiple screens.

If a secondary monitor was not discovered, however, the lighting adjustment module may prompt the user to use a mobile device (e.g. cellular telephone, smartphone, etc.) (e.g. FIG. 7E). The lighting adjustment module may be installed along with the virtual meetings application on the mobile device. In some implementations, with the use of machine learning algorithms, the lighting adjustment module may intelligently adjust the intensity of a camera flash light from the mobile device during the virtual meeting to provide a secondary lighting source for a well-lit video throughout the meeting.

In some implementations, the techniques and mechanisms of the present disclosure may further provide for flicker reduction. "Flicker" may come from multiple sources, for example, low-quality lighting power supply electronics that do not adequately filter line noise from household power. Such line noise may be associated with the standard 60 Hertz signal of the power grid or ceiling fans, which may periodically occlude light sources or cast shadows. The techniques and mechanisms of the present disclosure may be utilized to improve the temporal consistency of the lighting, which may increase the overall amount and temperature of light available, in flicker reduction. In some implementations, the lighting adjustment module may utilize machine learning algorithms to detect the variations in the incoming video stream and determine their periodicity. Based on the analysis, the amount of light supplied to illuminate the subject may be varied over time to compensate for the flicker.

Thus, according to the present disclosure, the lighting adjustment module may adaptively adjust the digital light emitting from a user's existing display configuration intelligently, according to the user's ambient lighting conditions and the currently displayed content on the screen during screen-sharing. The lighting adjustment module may be installed on the computer for controlling the configuration of an external monitor or laptop screen, and be an additional part of the video teleconference meeting application. The solution may be utilized to provide consistent and well-lit lighting and illumination to participants during video teleconference meetings. The lighting adjustment module may enhance the video-based virtual meetings for users by proposing to utilize a variety of existing monitor/screen configurations, to provide adaptive brightness and temperature throughout the meeting. This may be achieved while saving costs for the user (e.g. those associated with the purchasing of external lighting setups), being environment friendly, and reducing overall eye strain of the users.

FIG. 9 illustrates a hardware block diagram of a computing device 900 that may perform functions associated with operations discussed herein in connection with the techniques described in relation to the above figures, especially in relation to FIGS. 2-4, 5A-5B, 6, 7A-7E, and 8A-8B. In various embodiments, a computing device, such as computing device 900 or any combination of computing devices 900, may be configured as any entity/entities as discussed for the techniques depicted in connection with the figures in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    at a user device operative to adjust lighting of a video of a participant in a virtual meeting facilitated by a virtual meeting application of the user device,
        causing a user display prompt to be displayed at the user device, the user display prompt indicating a plurality of display configurations for user selection;
        receiving a user selection of a selected display configuration from among the plurality of display configurations in the user display prompt;
        sending, to a cloud server, a message which indicates the selected display configuration for storage in a user display profile;
        receiving, from the cloud server, baseline lighting setting parameters associated with the selected display configuration at the user device;
        applying the baseline lighting setting parameters to one or more displays of the selected display configuration at the user device; and
        using the baseline lighting setting parameters as a baseline, adjusting brightness and/or color pixels of the one or more displays of the selected display configuration at the user device for the lighting of the video of the participant.

2. The method of claim 1, further comprising, at the user device:
    sending to the cloud server a message which indicates a request for the baseline lighting setting parameters.

3. The method of claim 1, further comprising, at the user device:
    receiving, from the cloud server, a request for user selection of a display configuration from among the plurality of display configurations,
    wherein the user display prompt is displayed at the user device in response to receiving the request.

4. The method of claim 1, wherein the selected display configuration comprises a selected one of a plurality of display configurations including:
    a user display of the user device,
    a plurality of displays connected at the user device,
    the user display of the user device and an alternate display of a laptop or a tablet, and
    the user display of the user device and a mobile display of a mobile device.

5. The method of claim 1, further comprising at user device:
    sending, to the cloud server, display configuration information associated with the selected display configuration at the user device, the display configuration information including one or more of a display configuration setting value, a number of displays, an arrangement of displays, and display make and model information.

6. The method of claim 1, further comprising at the user device:
    obtaining lighting environment parameters based on sensing a lighting environment of the user device;
    wherein adjusting the brightness and/or the color pixels of the one or more displays of the selected display configuration is performed according to the lighting environment parameters.

7. The method of claim 1, further comprising:
    at the cloud server,
        receiving from the user device a message which indicates lighting setting parameters associated with the lighting of the video of the participant; and
        storing, in the user display profile, the lighting setting parameters in association with the selected display configuration, for subsequent use by the user device as the baseline lighting setting parameters for the selected display configuration.

8. The method of claim 7, wherein the message which indicates the lighting setting parameters further indicates lighting environment parameters associated with a lighting environment of the user device.

9. The method of claim 7, further comprising at the cloud server:
    performing a machine learning process to generate a plurality of baseline lighting setting parameters respectively associated with a plurality of display configurations, based on the lighting setting parameters received from a plurality of user devices respectively associated with a plurality of participants.

10. A computer program product comprising:
a non-transitory computer readable medium; and
instructions in the non-transitory computer readable medium;
the instructions being executable by one or more processors of a user device configured to adjust lighting of a video of a participant in a virtual meeting facilitated by a virtual meeting application for use on the user device, by:
    causing a user display prompt to be displayed at the user device, the user display prompt indicating a plurality of display configurations for user selection;
    receiving a user selection of a selected display configuration from among the plurality of display configurations in the user display prompt;
    sending, to a cloud server, a message which indicates the selected display configuration for storage in a user display profile;
    receiving, from the cloud server, baseline lighting setting parameters associated with the selected display configuration at the user device;

applying the baseline lighting setting parameters to one or more displays of the selected display configuration at the user device; and using the baseline lighting setting parameters as a baseline, adjusting brightness and/or color pixels of the one or more displays of the selected display configuration at the user device for the lighting of the video of the participant.

11. The computer program product of claim 10, wherein the instructions are further executable by the one or more processors of the user device for:

sending to the cloud server a message which indicates a request for the baseline lighting setting parameters.

12. The computer program product of claim 10, wherein the instructions are further executable by the one or more processors of the user device for:

receiving, from the cloud server, a request for user selection of a display configuration from among the plurality of display configurations, wherein the user display prompt is displayed at the user device in response to receiving the request.

13. The computer program product of claim 10, wherein the selected display configuration comprises a selected one of a plurality of display configurations including:

a user display of the user device, a plurality of displays connected at the user device, the user display of the user device and an alternate display of a laptop or a tablet, and the user display of the user device and a mobile display of a mobile device.

14. The computer program product of claim 10, wherein the instructions are further executable by the one or more processors of the user device for:

sending, to the cloud server, display configuration information associated with the selected display configuration at the user device, the display configuration information including one or more of a display configuration setting value, a number of displays, an arrangement of displays, and display make and model information.

15. The computer program product of claim 10, wherein the instructions are further executable by the one or more processors of the user device for:

obtaining lighting environment parameters based on sensing a lighting environment of the user device, wherein adjusting the brightness and/or the color pixels of the one or more displays of the selected display configuration is based on the lighting environment parameters.

16. A user device comprising:
one or more processors; and
one or more memory elements for storing instructions executable on the one or more processors for adjusting lighting of a video of a participant in a virtual meeting facilitated by a virtual meeting application for use on the user device, by:

causing a user display prompt to be displayed at the user device, the user display prompt indicating a plurality of display configurations for user selection;

receiving a user selection of a selected display configuration from among the plurality of display configurations in the user display prompt;

sending, to a cloud server, a message which indicates the selected display configuration for storage in a user display profile;

receiving, from the cloud server, baseline lighting setting parameters associated with the selected display configuration at the user device;

applying the baseline lighting setting parameters to one or more displays of the selected display configuration at the user device; and using the baseline lighting setting parameters as a baseline, adjusting brightness and/or color pixels of the one or more displays of the selected display configuration at the user device for the lighting of the video of the participant.

17. The user device of claim 16, wherein the instructions are further executable on the one or more processors for:

sending to the cloud server a message which indicates a request for baseline lighting parameters.

18. The user device of claim 16, wherein the instructions are further executable on the one or more processors for:

receiving, from the cloud server, a request for user selection of a display configuration from among the plurality of display configurations, wherein the user display prompt is displayed at the user device in response to receiving the request.

19. The user device of claim 18, wherein the selected display configuration comprising the selected one of the plurality of display configurations including:

a user display of the user device, a plurality of displays connected at the user device, the user display of the user device and an alternate display of a laptop or a tablet, and the user display of the user device and a mobile display of a mobile device.

20. The user device of claim 16, wherein the instructions are further executable on the one or more processors for:

obtaining lighting environment parameters based on sensing a lighting environment around the user device, wherein adjusting the brightness and/or the color pixels of the one or more displays of the selected display configuration is based on the lighting environment parameters.

* * * * *